United States Patent
Rosen

(10) Patent No.: US 6,789,468 B2
(45) Date of Patent: Sep. 14, 2004

(54) DEVICE FOR FORMING FRUIT KABOBS

(76) Inventor: Harvey Rosen, 747 Vassar Ave., Lakewood, NJ (US) 08701

( * ) Notice: Subject to any disclaimer, the term of this patent is extended or adjusted under 35 U.S.C. 154(b) by 107 days.

(21) Appl. No.: 10/147,562

(22) Filed: May 20, 2002

(65) Prior Publication Data
US 2003/0213376 A1 Nov. 20, 2003

(51) Int. Cl.⁷ .......................... A47J 37/04; A47J 23/00; B26B 27/00

(52) U.S. Cl. .............................. 99/538; 99/419; 99/484; 30/130

(58) Field of Search ................... 99/484, 419, 421 A, 99/421 H, 421 HH, 537, 538; 30/130, 316, 123, 115

(56) References Cited

U.S. PATENT DOCUMENTS 4,352,242 A * 10/1982 Plet .......................... 30/316 X

* cited by examiner

Primary Examiner—Reginald L. Alexander
(74) Attorney, Agent, or Firm—Herman H Bams

(57) ABSTRACT

A device for forming a fruit kabob from uniform sections of fruit including melons comprises an elongate, preferably transparent, shaping tube. In one embodiment, the shaping tube is of cylindrical configuration and in another embodiment the shaping tube is of generally rectangular configuration. An elongate plunger is positioned in the shaping tube and moveable therein. The shaping tube has a cutting edge at its front end and when pressed successively into fruit forming uniform sections of fruit within the tube. A skewer is inserted into the shaping tube and through the side of the plunger to impale the cut fruit sections thereon whereby when the plunger is advanced, the impaled fruit sections and skewer will be expelled from the shaping tube.

6 Claims, 2 Drawing Sheets

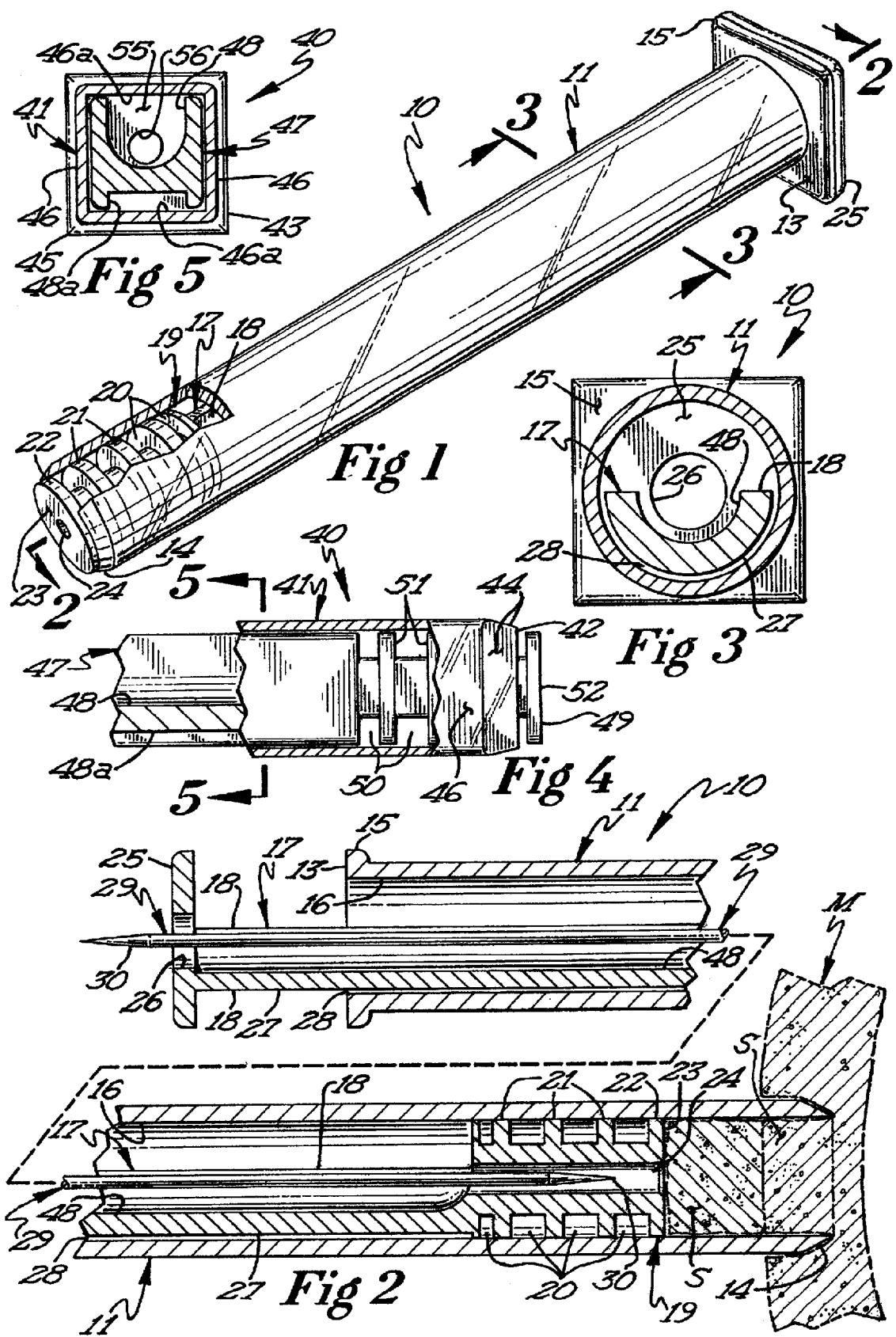

DEVICE FOR FORMING FRUIT KABOBS

FIELD OF THE INVENTION

This invention relates to a device for shaping, retaining and skewering a plurality of fruit sections on a skewer to produce a fruit kabob.

SUMMARY OF THE INVENTION

An object of this invention is to provide a device for shaping and skewering a plurality of fruit sections on a skewer to produce a fruit kabob.

The device includes a shaping tube and a plunger moveable within the shaping tube. The shaping tube may be of cylindrical or rectangular configuration and is provided with a cutting edge at its front end to facilitate cutting the fruit. The shaping tube is pressed or punched into fruit, preferably melon, to form fruit sections of uniform cross-sectional size. Different kinds of melon or fruit may be alternated to form a colorful arrangement. A skewer is inserted through the tube and through the side of the plunger, and the plunger is moved forwardly expelling the skewer and impaled fruit to form a fruit kabob.

BRIEF DESCRIPTION OF THE FIGURES OF THE DRAWING

FIG. 1 is a perspective view of one embodiment of the novel device with certain parts thereof broken away to show details of underlying parts;

FIG. 2 is a longitudinal sectional view taken approximately along line 2—2 of FIG. 1 and looking in the direction of the arrows.

FIG. 3 is a cross-sectional view taken approximately along line 3—3 of FIG. 1 and looking in the direction of the arrows;

FIG. 4 is a fragmentary side elevational view of a different embodiment of the device with certain parts thereof broken away for clarity;

FIG. 5 is a cross-sectional taken approximately along line 5—5 of FIG. 4 and looking in the direction of the arrows.

DESCRIPTION OF THE PREFERRED EMBODIMENT

Figure 6:
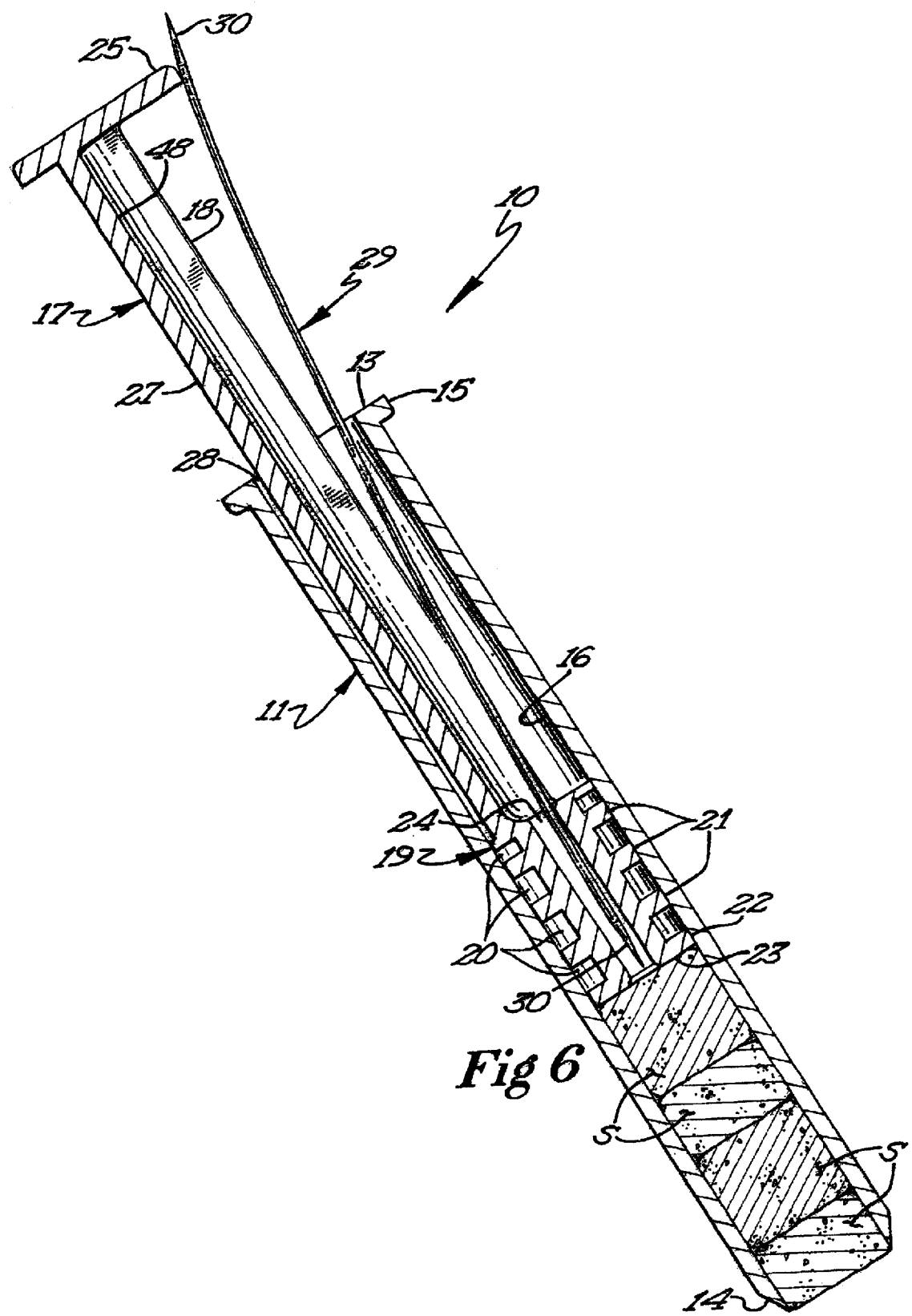
FIG. 6 is a longitudinal sectional view of the novel device shown in FIGS. 1–3 illustrating the position of the fruit sections prior to the sections being impaled on a skewer.

Referring now to the drawings and more specifically to FIGS. 1 to 3 and 6, it will be seen that one embodiment of the novel device 10 for forming fruit kabobs is thereshown. The device 10 includes an elongate tubular shaping and retaining member 11. The tubular shaping member or shaping tube 11 is of generally cylindrical configuration and includes a front end 12 having beveled cutting 14. The rear end 13 of the tubular shaping member 11 has generally rectangular outturned flange 15. The tubular shaping member has a smooth cylindrical in surface 16.

The device 10 also includes an elongate plunger 17 having a length dimension corresponding to the length dimension of shaping member or tube 11. While the shaping tube 11 is made of a transparent polymer or plastic material, the plunger 17 may be formed of an opaque plastic material. The plunger 17 is of generally arcuate or U-shaped cross-sectional configuration throughout a major portion of its length as illustrated in FIGS. 2 and 3.

However, the front end portion 19 of the plunger 17 is of cylindrical configuration having longitudinally spaced apart circumferential recesses therein which define cylindrical ribs 21. A cylindrical front rib 22 defines the front end of the plunger and has a flat front surface 23. The front end portion 19 has an axial opening 24 therethrough as best seen in FIG. 2

The plunger 17 has an enlarged rectangular rear end element 25 corresponding in size and shape to the outturned flange 15 of the shaping tube 11. The rear end element 25 has an opening 26 therethrough disposed in coaxial relation with the opening 24. It will be noted that the arcuate lower surface 27 of the u-shaped portion of the plunger 17 is spaced from the inner surface of the shaping tube 11 thereby defining a clearance space 28 therebetween. The cylindrical or annular ribs 21, 22 engage the inner surface of the shaping tube 11 and provide the bearing surface for the plunger.

The device 10 also includes a plurality of elongate skewers 29 having pointed ends 30. Each skewer is used to skewer or impale cut fruit or melon sections 5 when forming the fruit kabob. In the embodiment shown, the skewers are made of bamboo but other rigid materials may also be used.

Referring now to FIGS. 4 and 5, it will be seen that another embodiment of the device is thereshown. The embodiment of the device 40 shown in FIGS. 4 and 5 includes an elongate shaping tube 41 of rectangular cross-sectional configuration. The shaping tube 41 has a front end 42 and a rear end 43. The front end 42 is defined by a beveled cutting edge 44 in the manner of the embodiment of FIGS. 1–3. The shaping tube 41 has an outturned flange 45 at its rear end in the manner of the embodiments of FIGS. 1–3.

Although the shaping tube may have other shapes, the shaping tube 41 is of square cross-sectional configuration having opposed pairs of sides 46. The shaping tube 40 also has opposed pairs of inner surfaces 46a. It is preferred that the shaping tube is formed of a transparent plastic material.

The device 40 also includes an elongated plunger 47 which moveable in the shaping tube 40 in the manner of the embodiment of FIGS. 1–3 and 6. The plunger 47 has a generally U-shaped recess 48 therein and a generally rectangular notch 48a therein. The recess 48 is formed in the upper longitudinal surface of the plunger while the notch is formed in the lower surface thereof The recess 48 and notch 48a extend throughout the major portion of the length of the plunger.

The front end portion 49 of the plunger 47 is of square cross-sectional configuration and is provided annular recesses 50 defining rectangular or square ribs 51. The plunger 47 is also provided with a front rib 52 having a flat front surface 53. The front end portion 49 has a centrally located opening 54 therethrough. The rear end 43 is provided with an end piece 55 having an opening 56 therein.

The device for forming fruit kabobs is best used with melons including cantaloupe, honeydew, melons and watermelons although other kinds of fruit may also be used. For example, the outer skin of the melon is first removed, the seeds are removed and the melons are halved. A one inch slice is cut from a watermelon. The shaping tube 11 or 41 is pushed or punched into a melon halve or slice, as illustrated in FIG. 6, to cut a melon section which is retained in the shaping tube. These cut sections of melon will progressively cause the plunger to be retracted until several sections have been cut.

A skewer is inserted through the opening in the side of the plunger and through the center of the cut melon sections in the shaping tube. The impaled or skewered fruit sections and skewer will be urged out of the shaping tube when the plunger is moved forwardly. In the embodiment shown, the inside diameter of the shaping tube 11 is approximately one inch thereby producing uniform cut melon sections one inch in diameter.

Similarly, each side of the shaping tube 41 has a one inch width. Although the size of the shaping tube may vary, the one inch size appears to be a popular size. When cutting the melon sections or other fruit, one may alternate one kind of melon with others. For example, honeydew melon, cantaloupe and watermelon may be alternately cut thereby producing a colorful and appetizing fruit kabob.

The cut sections will be of uniform cross-sectional size and shape (rectangular or cylindrical). Since the shaping tubes are transparent, a user will be able to observe the cut sections within the shaping tube. The device may be used to cut melons and other fruit without impaling these sections on a skewer. These cut sections may be used with other fruit to create a colorful fruit salad.

It will be seen that I have provided a novel device for quickly and easily forming fruit kabobs. It will further be seen that my novel device is of simple and inexpensive construction and is readily usable by even inexperienced food preparers.

What is claimed is:

1. A device for forming fruit kabobs, comprising an elongate shaping tube having front and rear ends, said shaping tube having a cutting edge at its front end, an elongate plunger having a front end positioned within and engaging said shaping tube and moveable therein and having a end rear positioned exteriorly of the shaping tube, said front end of the plunger having an axially extending opening therein, said plunger having a channel-shaped passage therein, said channel-shaped passage being unobstructed between the rear and front ends of the plunger and communicating with the axial opening in the front end of the plunger, said shaping tube when successively pressed into fruits including melons forming fruit sections of uniform cross-sectional size within the shaping tube, and an elongate skewer insertable into the rear end of the shaping tube and through the side of the plunger along the channel-shaped passage and through the axial opening in the front and of the plunger to impale the cut fruit sections on the skewer whereby when the plunger is moved in a forward direction the impaled fruit sections and skewer will be expelled from the shaping tube to form a fruit kabob.

2. The device as defined in claim 1 wherein said shaping tube is of cylindrical configuration.

3. The device as defined in claim 1 wherein said shaping tube is of rectangular cross-sectional configuration.

4. The device as defined in claim 1 wherein said shaping tube is formed of a transparent material.

5. The device as defined in claim 1 wherein said plunger has a length dimension corresponding generally to the length dimension of the shaping tube and is of arcuate cross-sectional configuration between said front and rear ends of the plunger.

6. The device as defined in claim 1 wherein the plunger has a substantially flat front face having a centrally located opening therein communicating with the passage in the plunger.

* * * * *